March 17, 1959 D. W. KLIBANOW 2,877,509
TRAILER CONSTRUCTIONS
Filed Oct. 11, 1957 2 Sheets-Sheet 1

INVENTOR.
DAVID W. KLIBANOW
BY
*Phreedy & Phreedy*
HIS ATTORNEYS.

March 17, 1959

D. W. KLIBANOW 2,877,509

TRAILER CONSTRUCTIONS

Filed Oct. 11, 1957

INVENTOR.
DAVID W. KLIBANOW
BY
Threedy & Threedy
HIS ATTORNEY

United States Patent Office 2,877,509
Patented Mar. 17, 1959

2,877,509

TRAILER CONSTRUCTIONS

David W. Klibanow, Chicago, Ill.

Application October 11, 1957, Serial No. 689,624

6 Claims. (Cl. 20—2)

This invention relates to new and useful improvements in trailer constructions and more particularly to the body portion thereof which is provided with expansible and contractable side wall sections.

A further object of my invention is to provide in a trailer an improved laterally extensible vehicle body enclosure.

Another object of my invention is in the provision in a device of this character of a means for laterally moving the side wall sections with respect to the rigid vehicle body.

Yet another object of my invention is in the provision in a device of this character of a means for vertically moving the side wall sections out of a horizontal plane and through an arcuated path when the side wall sections are moved relative to the rigid vehicle body.

Yet another object of my invention is to provide in a device of this character an expandible wall unit which is relatively simple and inexpensive of manufacture and which is readily adaptable throughout a wide length of use of adaptations.

Other objects will appear hereinafter.

The invention consists in the novel combination and arrangement of parts to be hereinafter described and claimed.

The invention will be best understood by reference to the accompanying drawings showing the preferred form of construction, and in which.

It has been desirable in the manufacturing of mobile trailers to provide means whereby when said trailer is stationary, the confines of the trailer which provide living quarters may be readily enlarged. To accomplish this purpose, I illustrate, describe and claim herein a method by which a side portion of the trailer may be expanded.

Figure 1:
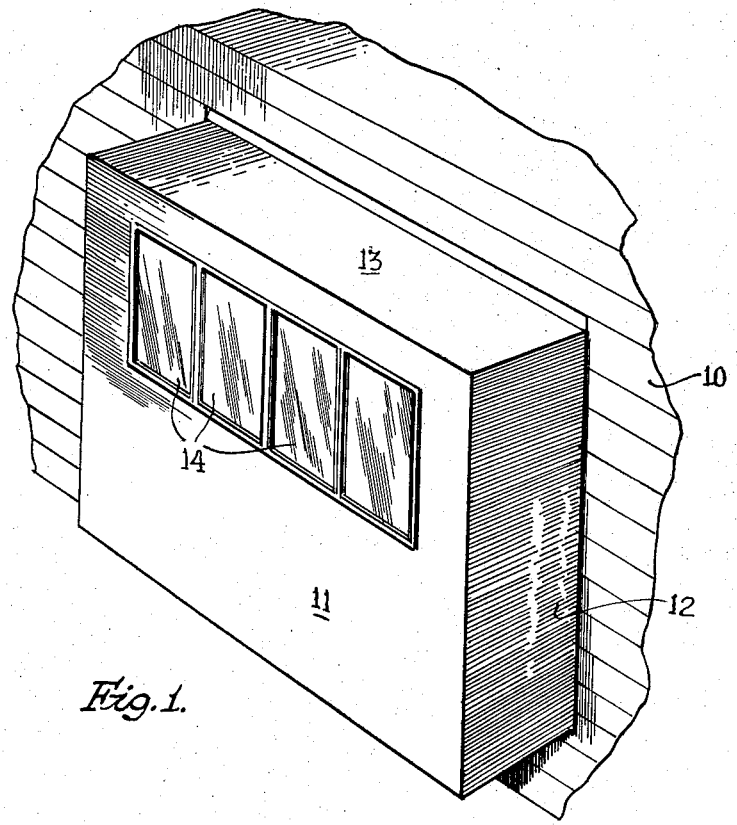
Fig. 1 is a fragmentary perspective view of a portion of a side wall of a trailer with my improved expansible wall section in its outermost position.

Referring to Fig. 1, I have fragmentarily shown one side wall 10 of a mobile trailer unit. Extending outwardly from this side wall 10 is my movable wall unit which includes a front wall 11, side walls 12 and top and bottom walls 13. The front wall 11 may be provided with a plurality of suitable windows 14.

Figure 3:
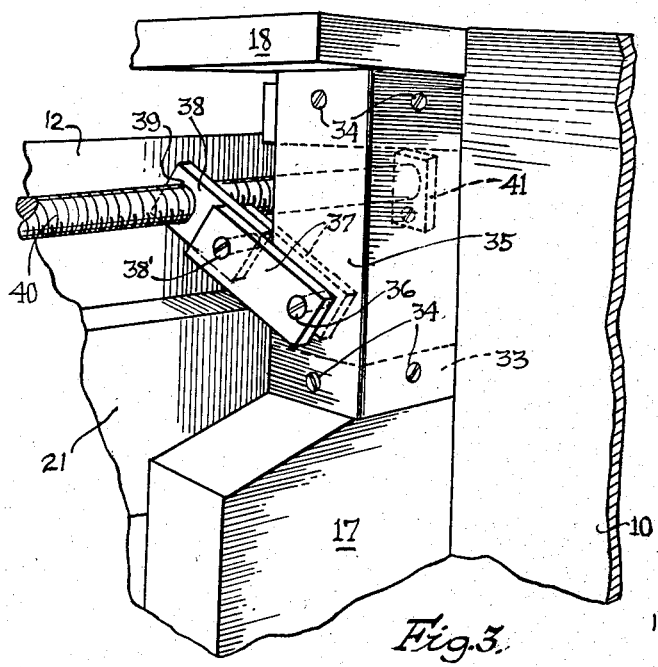
Fig. 3 is a fragmentary perspective view of the operative parts by which horizontal movement of the side wall sections is achieved.
Figure 4:
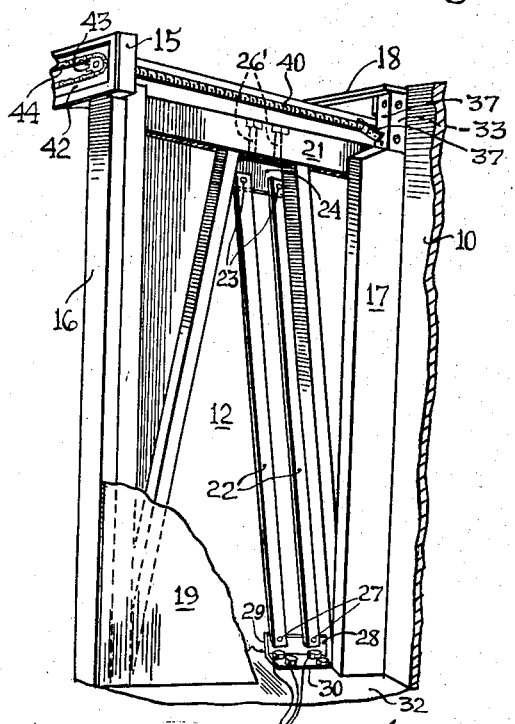
Fig. 4 is a perspective view of one side panel and parts thereof of my improved movable side wall unit.
Figure 5:
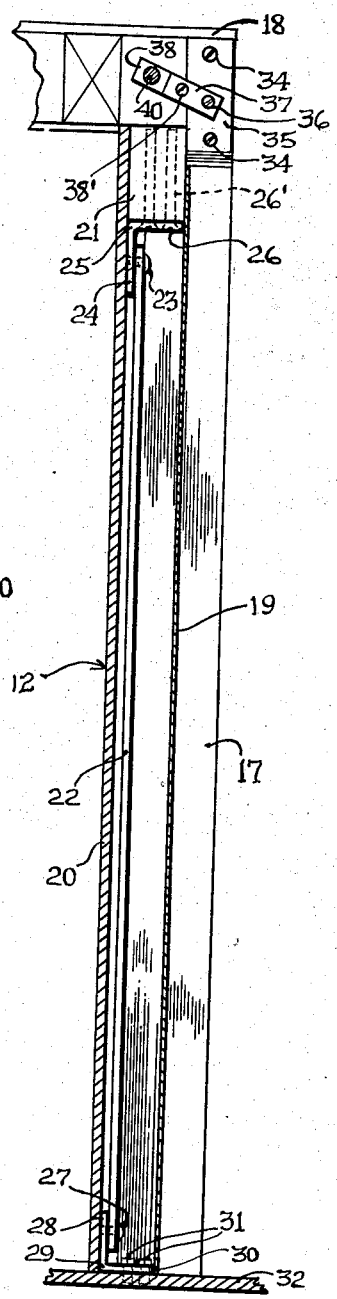
Fig. 5 is a fragmentary end elevational view of the side panel supports.

The movable wall unit consists of a frame comprising a header 15, which is supported by suitable end members 16. The wall 10 of the trailer adjacent the opening formed therein through which the movable wall section is adapted to pass, is provided with vertical posts 17 connected by a head plate 18 as viewed in Figs. 3 and 4. This constitutes an opening frame jamb. The side walls 12 of the movable side wall unit constitutes a hollow unit which include the outer wall covering 19, an inner finished wall portion 20 connected together by a head member 21. The wall portions 19 and 20 as well as the head member 21 are connected along the longitudinal edges thereof to the end member 16 as viewed in Figs. 4 and 5. Positioned within the hollow side wall unit is a pair of cantilevers 22. The top portions of these cantilevers 22 are pivotally connected as at 23 to one flange 24 of an angle iron 25. The opposite flange 26 of the angle iron 25 is bolted as at 26' to the head member 21 as seen in Fig. 5. The lower end of the cantilevers 22 are pivotally connected as at 27 to the vertical flange 28 of an angle iron 29. This angle iron 29 has its horizontal flange 30 connected by means of bolts 31 in a stationary relation to the floor 32 of the rigid body portion of the trailer unit. Each of the vertical posts 17 which are a part of the frame jamb surrounding the opening for the movable side wall section has connected to a reduced upper portion 33 thereof by means of screws 34, a metal sheath plate 35. Pivotally connected as at 36 to a portion of the metal plate 35 and to either side thereof is a pair of arms 37. The arms 37 are of such a length so as to extend beyond the longitudinal edge of the metal plate 35 as viewed in Fig. 3. Rigidly positioned between the free ends of the arms 37 and connected thereto as at 38' is an extension 38. This extension 38 is provided with a threaded bore 39 through which extends a threaded rod 40.

One end of the rod 40 is rotatably mounted in a bushing structure 41 carried by the inner face of the front wall 11. The opposite end of the rod 40 journals through the header 15. The inner vertical face of the header 15 is rabbeted out as at 42. Connected to the end of the rod 40 which is journalled through the header 15 and extends through this rabbeted out portion 42 is a sprocket wheel 43. This sprocket wheel is operatively connected to a chain 44 which passes over a like sprocket wheel 45 carried on the drive shaft 46' of an electric motor 46. This motor 46 is contained behind the header 15 within a chamber provided by the exterior top wall 13 of the movable side unit and a finished ceiling (not shown).

Figure 2:
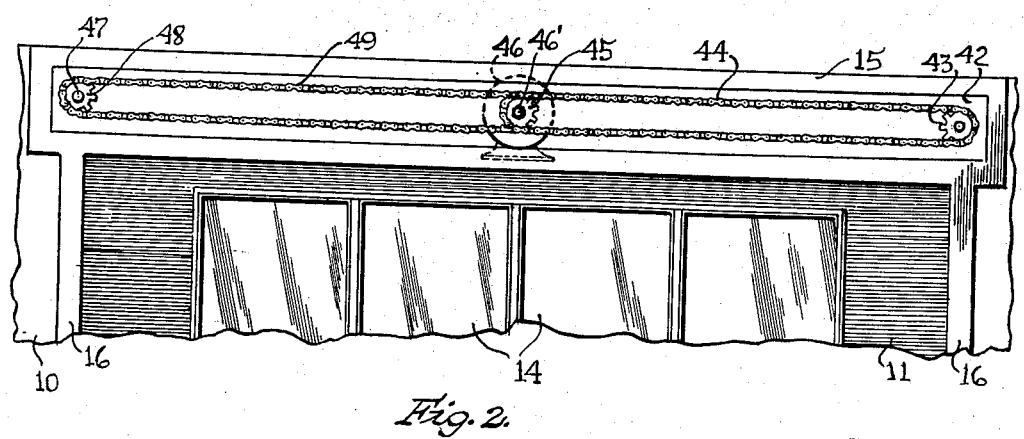
Fig. 2 is a fragmentary front plan view of the top portion of the inside of the movable wall section showing in dotted lines an electric motor for moving the same.

Referring to Fig. 2, it is pointed out that each side wall is of like construction, there being a rod 47 like the rod 40 providing a sprocket wheel 48 for the opposite side unit of the movable side wall section. This rod 47 is likewise connected to the motor 46 by a chain 49 passing over a second sprocket wheel (not shown) carried by the driving shaft of the electric motor 46.

When the electric motor is energized, the sprocket wheels 43 and 48 through the chains 44 and 49 will be caused to rotate. This in turn will rotate the rods 40 and 47. As such, the rods 40 and 47 will thread themselves through the threaded bore 39 of the extensions 38, there being a like arrangement for the rod 47 as that shown and described in Figs. 3 and 4 for the rods 40. As such rods 40 and 47 thread their way through the extension 38, the movable unit will be caused to be expanded and contracted within or without the rigid wall structure of the trailer unit.

By the use of the cantilevers 22 which when the movable unit is either in its extended or contracted position (the latter being shown in Fig. 4) are displaced out of a vertical plane, I am able to achieve a slight rise of the movable unit off its "at rest" position during its movement relative to the rigid wall 10 of the trailer unit. As the cantilevers 22 are pivotally connected at the ends and are fixed to the floor 32 at their lowermost ends, when they reach their perpendicular position with respect to such floor 32 they will have moved their upper pivotal end through an arcuate rise, which causes such movable unit to be raised and set in either its extended or contracted position. To compensate for such vertical rise through an arcuate plane the rods 40 and 47 through the respective extensions 38 are pivotally connected as at 36 to the metal plates 35 hereinbefore described.

It is to be understood that a suitable method of insulating the opening formed in the side wall 10 when the movable unit is either in this extended or contracted position will be applied so that at all times the trailer unit is weather-proofed.

While I have illustrated and described the preferred form of construction for carrying my invention into effect, this is capable of variation and modification without departing from the spirit of the invention. I, therefore, do not wish to be limited to the precise details of construction set forth, but desire to avail myself of such variations and modifications as come within the scope of the appended claims.

I claim:

1. A trailer body having vertically extending side walls provided with openings therein, wall sections positionable in the openings and movable laterally therethrough, means for moving said wall sections laterally with respect to said side walls through the openings, means for raising said wall sections out of a horizontal plane and through a vertical arcuated path when said moving means are moving said wall sections through the openings.

2. A trailer body having vertically extending side walls provided with openings therein, wall sections positionable in the openings and movable laterally therethrough, means for moving said wall sections laterally with respect to said side walls through the openings, means for raising said wall sections out of a horizontal plane and through a vertical arcuated path when said moving means are moving said wall sections through the openings, said last named means including a pair of cantilevers having one end pivotally attached to a portion of said body adjacent said opening and the opposite free end thereof pivotally supporting said wall sections, said cantilevers normally disposed at an acute angle with respect to said body portion when said wall sections are stationary so that when said wall sections are moved laterally with respect to said body the said opposite free end of the cantilevers will supportively move said side wall sections through a vertical arcuated plane so as to raise and lower said wall sections from facial abutment with said body as it is moved transversely with respect thereto.

3. A trailer body having vertically extending side walls provided with openings therein, wall sections positionable in the openings and movable laterally therethrough, means for moving said wall sections laterally with respect to said side walls through said openings, said moving means including a rod rotatably carried by said wall sections and threadably connected to a portion of said body, means for rotating said rod so as to thread said rod through said threadable connection to move said rod and said wall sections through said openings relative to said body, means for raising said wall sections out of a horizontal plane and through a vertical arcuated path when said moving means are moving said wall sections through the openings of the side walls.

4. A trailer body having vertically extending side walls provided with openings therein, wall sections positionable in the openings and movable laterally therethrough, means for moving said wall sections laterally with respect to said side walls through said openings, said moving means including a rod rotatably carried by said wall sections and threadably connected to a portion of said body, means for rotating said rod so as to thread said rod through said threadable connection to move said rod and said wall sections through said openings relative to said body, means for raising said wall sections out of a horizontal plane and through a vertical arcuated path when said moving means are moving said wall sections through the openings of the side walls, said last named means including a pair of cantilevers having one end pivotally attached to a portion of said body adjacent the openings and the opposite free end thereof pivotally supporting said wall sections, said cantilevers normally disposed at an acute angle with respect to said body portion when said wall sections are stationary so that when said wall sections are moved laterally with respect to said body the said opposite free end of the cantilevers will supportively move said side wall sections through a vertical arcuated plane so as to raise and lower said wall sections from facial abutment with said body as it is moved transversely with respect thereto.

5. In a vehicle having a rigid main body including vertical side walls with openings formed therein, each of said side walls providing a frame about said opening, side wall sections positionable in said frames and movable through said openings, said side wall sections each including a roof, floor, front and side walls, means carried by the side walls of said side wall sections for moving said side wall sections through said frames and openings, said means including a rod threadably connected to a thread bearing provided by said frame, means for threading said rod through said bearing so as to move said side wall sections through said openings, and means for raising said side wall sections out of a horizontal plane and through a vertical arcuated path when said moving means is moving said side wall sections through said frame and said openings.

6. In a vehicle having a rigid main body including vertical side walls with openings formed therein, each of said side walls providing a frame about said openings, side wall sections positionable in said frames and movable through the openings, said side wall sections each including a roof, floor, front and side walls, means carried by the side walls of said side wall sections for moving said side wall sections through said frames and openings, said means including a rod threadably connected to a thread bearing provided by said frame, means for threading said rod through said bearing so as to move said side wall sections through said openings, and means for raising said side wall sections out of a horizontal plane and through a vertical arcuated path when said moving means is moving said side wall sections through said frames and the openings, said last named means including a pair of cantilevers having one end pivotally attached to a portion of said main body adjacent the openings in the side walls and the opposite free end thereof pivotally supporting said side wall sections, said cantilevers normally disposed at an acute angle with respect to said body portion when said side wall sections are stationary so that when said side wall sections are moved laterally with respect to said body the said opposite free end of the cantilevers will supportively move said side wall sections through a vertical arcuated plane so as to raise and lower said wall sections from facial abutment with said frame and body portion as it is moved transversely with respect thereto.

No references cited.